(12) United States Patent
Briliauskas

(10) Patent No.: US 11,574,059 B1
(45) Date of Patent: Feb. 7, 2023

(54) CLASSIFICATION OF DATA FILES

(71) Applicant: UAB 360 IT, Vilnius (LT)

(72) Inventor: Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/844,656

(22) Filed: Jun. 20, 2022

(51) Int. Cl.
  *G06F 21/56* (2013.01)
  *G06F 16/174* (2019.01)

(52) U.S. Cl.
  CPC ........ *G06F 21/565* (2013.01); *G06F 16/1744* (2019.01); *G06F 21/562* (2013.01); *G06F 2221/034* (2013.01)

(58) Field of Classification Search
  CPC ...... G06F 21/56; G06F 21/562; G06F 21/565; G06F 16/16; G06F 16/1744; G06F 2221/034
  See application file for complete search history.

(56) References Cited

U.S. PATENT DOCUMENTS 8,327,443 B2 * 12/2012 Eiland ..................... G06F 21/55
                                                          726/23
2008/0077793 A1 * 3/2008 Tan .......................... G06F 21/56
                                                          713/168
2020/0099699 A1 * 3/2020 Saad ..................... G06F 11/2076

FOREIGN PATENT DOCUMENTS

CN          110210224 A  *  9/2019  .......... G06F 21/563
WO   WO-2018136020 A1  *  7/2018  ......... G06F 21/6245

* cited by examiner

*Primary Examiner* — Jayesh M Jhaveri
(74) *Attorney, Agent, or Firm* — The Pattani Law Group

(57) ABSTRACT

A method including determining a combined data set including query data files that are to be classified, clean data files that are known to be free of malware, and malicious data files that are known to include malware; calculating respective compression functions for each of the query data files, each of the clean data files, and each of the malicious data files; individually comparing each respective compression function with each other respective compression function to determine degrees of similarity between contents included in the data files; determining a plurality of clusters based on the degrees of similarity between contents included in the data files; and classifying each query data file as a file that is likely free of malware or as a file that likely includes malware based on analyzing the combination of the query data files, the clean data files, and the malicious data files in each cluster.

20 Claims, 5 Drawing Sheets

CLASSIFICATION OF DATA FILES

FIELD OF DISCLOSURE

Aspects of the present disclosure generally relate to computers, and more particularly to classification of data files.

BACKGROUND

A data file may include a computer resource for recording data in a computer storage device, primarily identified by a file name. The data file may typically be organized in a file system, which may track the file location on the computer storage device and may enable user access. Different types of data files may be designed for different purposes. A data file may be designed to store data of a wide variety of data types. Certain data files may store multiple data types in a single file. A data file may be shared with and/or transferred by communicating the data file between computers over a network (e.g., Internet), by utilizing data cables, copying and moving the data file by utilizing. By way of one or more computer programs, the data file may be opened, read, changed, saved, and/or closed. Generally, the data file may be reopened, modified, and/or copied an arbitrary number of times.

SUMMARY

In one aspect, the present disclosure contemplates a method including determining, by a user device, a combined data set including query data files that are to be classified, clean data files that are known to be free of malware, and malicious data files that are known to include malware; calculating, by the user device, respective compression functions for each of the query data files, each of the clean data files, and each of the malicious data files; individually comparing, by the user device, each respective compression function with each other respective compression function to determine degrees of similarity between contents included in the data files; determining, by the user device, a plurality of clusters based at least in part on the degrees of similarity between contents included in the data files, each cluster including any combination of the query data files, the clean data files, and the malicious data files; and classifying, by the user device, each query data file as a file that is likely free of malware or as a file that likely includes malware based at least in part on analyzing the combination of the query data files, the clean data files, and the malicious data files in each cluster.

In another aspect, the present disclosure contemplates a user device including a memory and a processor configured to: determine a combined data set including query data files that are to be classified, clean data files that are known to be free of malware, and malicious data files that are known to include malware; calculate respective compression functions for each of the query data files, each of the clean data files, and each of the malicious data files; individually compare each respective compression function with each other respective compression function to determine degrees of similarity between contents included in the data files; determine a plurality of clusters based at least in part on the degrees of similarity between contents included in the data files, each cluster including any combination of the query data files, the clean data files, and the malicious data files; and classify each query data file as a file that is likely free of malware or as a file that likely includes malware based at least in part on analyzing the combination of the query data files, the clean data files, and the malicious data files in each cluster.

In another aspect, the present disclosure contemplates a non-transitory computer readable medium storing instructions, which when executed by a processor associated with a device, cause the processor to: determine a combined data set including query data files that are to be classified, clean data files that are known to be free of malware, and malicious data files that are known to include malware; calculate respective compression functions for each of the query data files, each of the clean data files, and each of the malicious data files; individually compare each respective compression function with each other respective compression function to determine degrees of similarity between contents included in the data files; determine a plurality of clusters based at least in part on the degrees of similarity between contents included in the data files, each cluster including any combination of the query data files, the clean data files, and the malicious data files; and classify each query data file as a file that is likely free of malware or as a file that likely includes malware based at least in part on analyzing the combination of the query data files, the clean data files, and the malicious data files in each cluster.

Aspects generally include a method, an apparatus, a system, a device, a computer program product, a non-transitory computer-readable medium, a control infrastructure, a wireless communication device, and/or processing system as substantially described herein with reference to and as illustrated by the drawings and specification.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
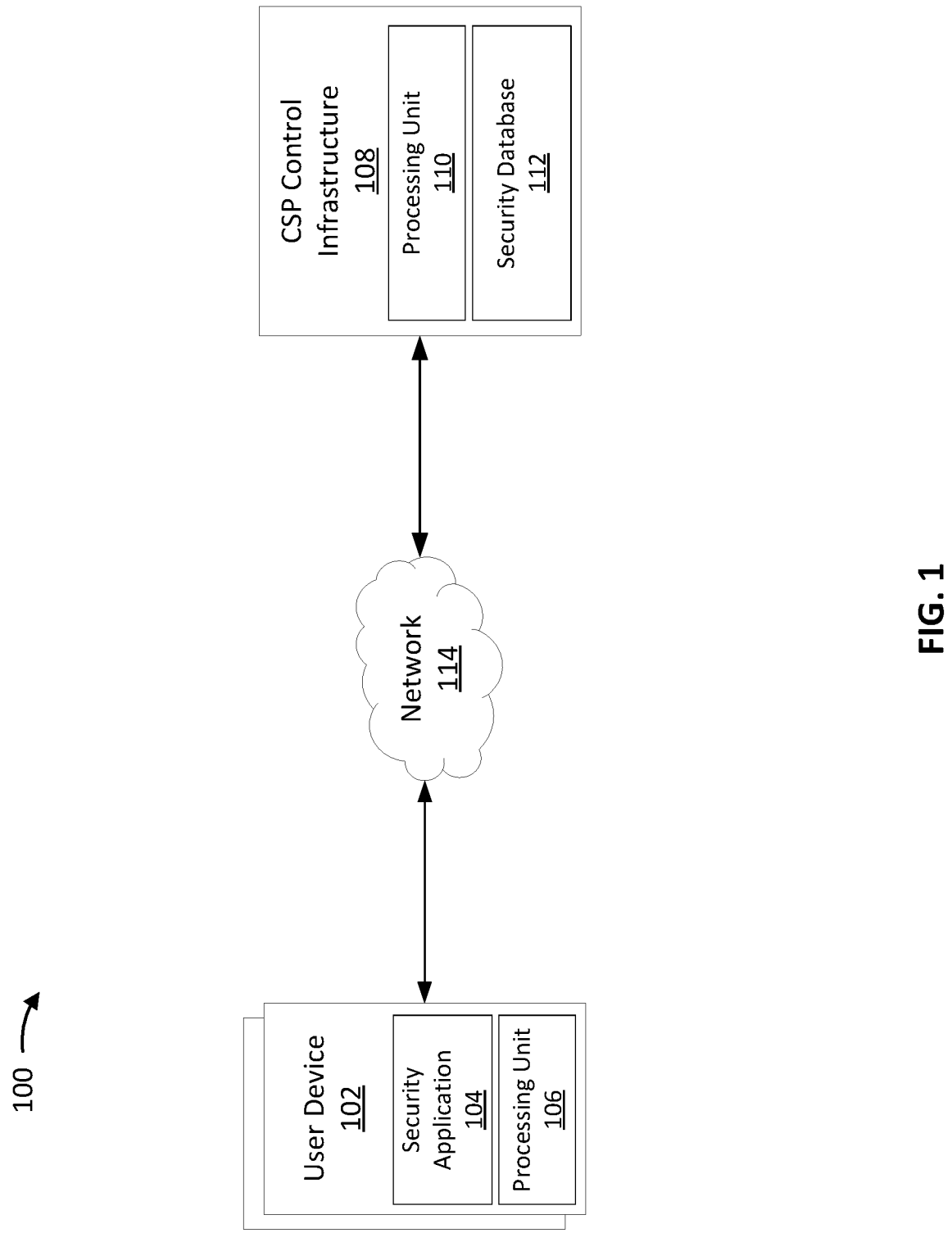

FIG. 1 is an illustration of an example system associated with classification of data files, according to various aspects of the present disclosure.

Figure 2:
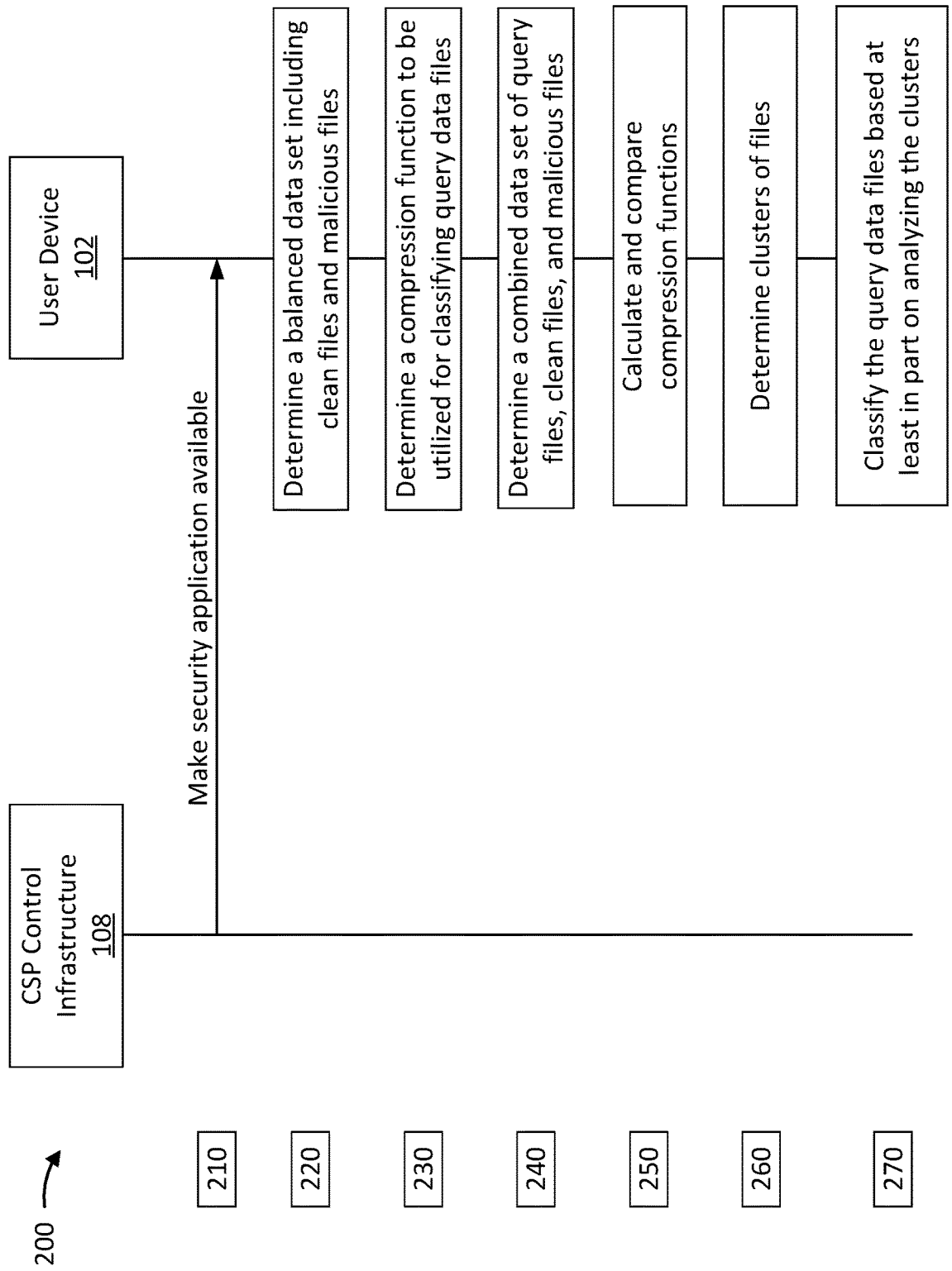

FIG. 2 is an illustration of an example flow associated with classification of data files, according to various aspects of the present disclosure.

Figure 3:
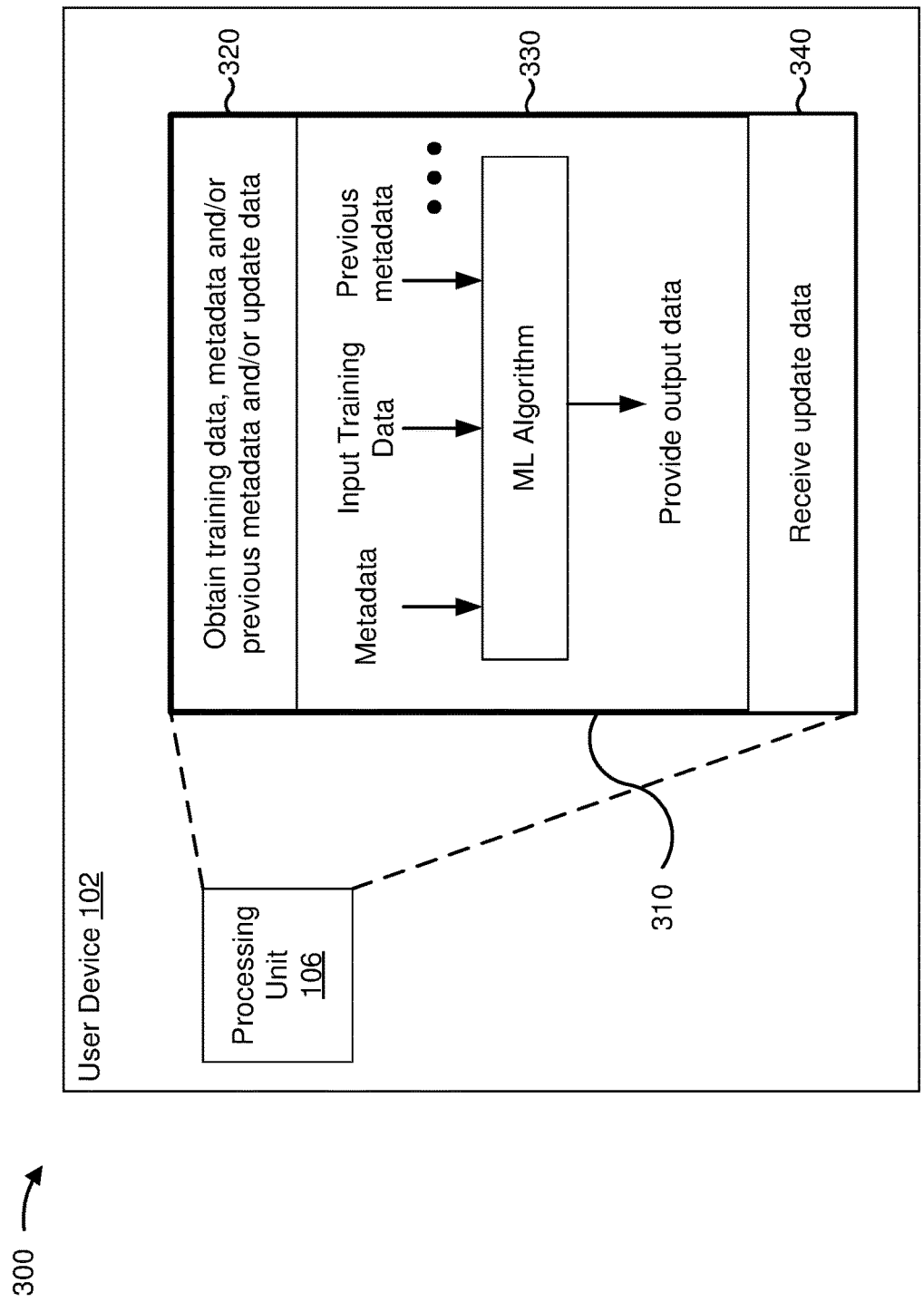

FIG. 3 is an illustration of an example associated with classification of data files, according to various aspects of the present disclosure.

Figure 4:
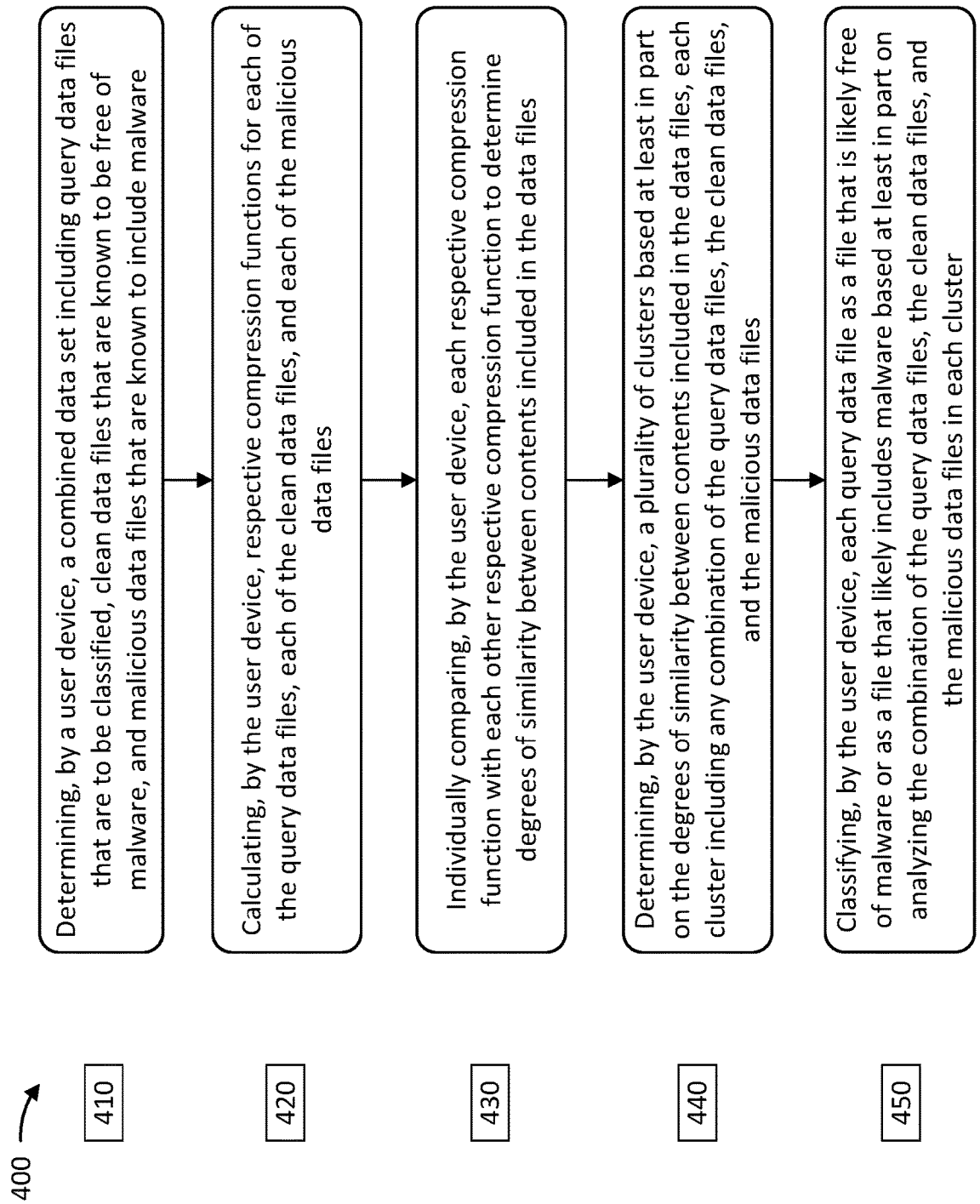

FIG. 4 is an illustration of an example process associated with classification of data files, according to various aspects of the present disclosure.

Figure 5:
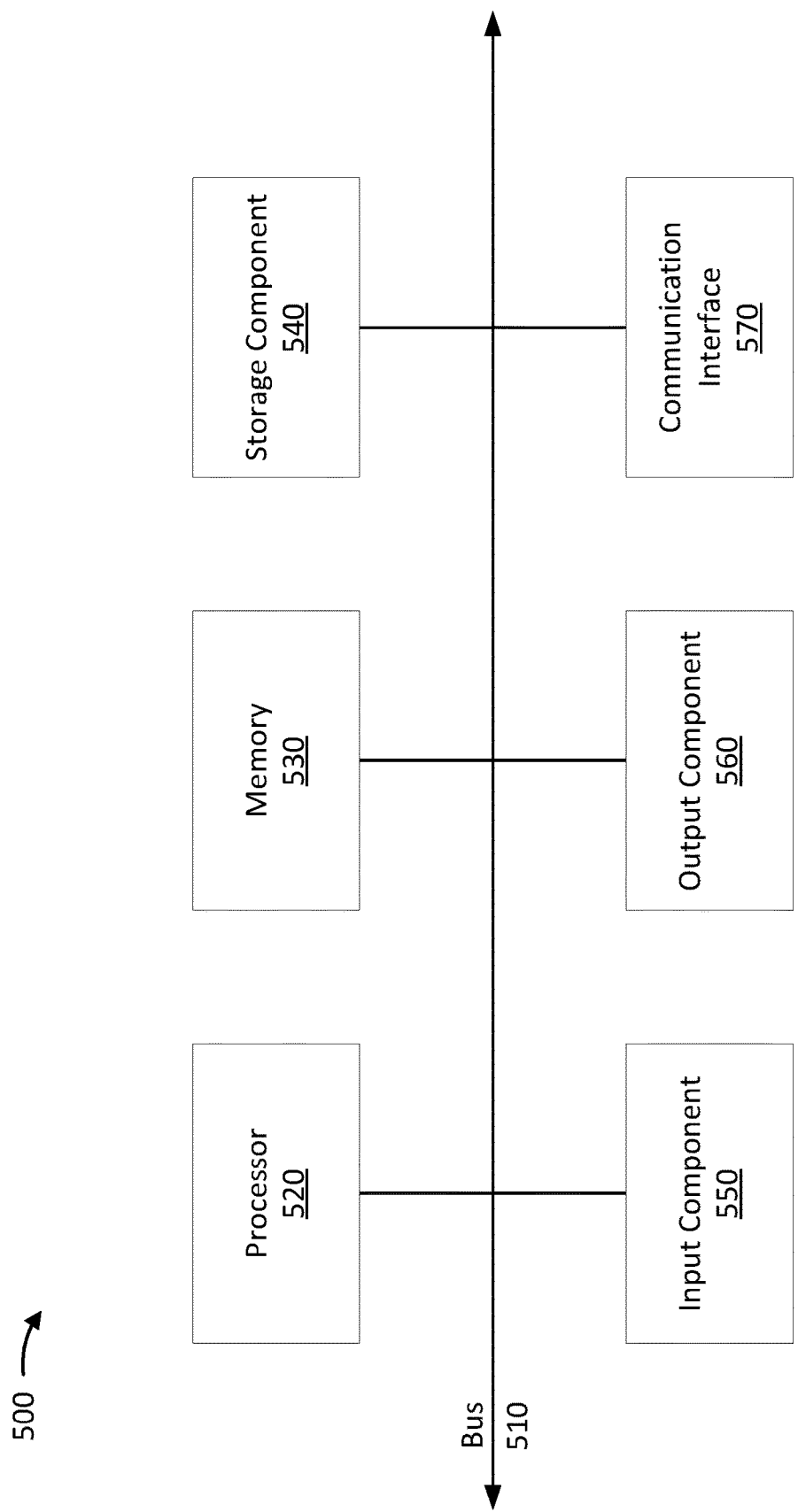

FIG. 5 is an illustration of example devices associated with classification of data files, according to various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with classification of data files, according to various aspects of the present disclosure. Example 100 shows an architectural depiction of included components. In some aspects, the components may include one or more user devices 102 configured to communicate over a network 114 with cyber security service provider (CSP) control infrastructure 108.

In some aspects, a user device 102 may install an instance of a security application 104 and may include a processing unit 106. Non-limiting examples of a user device 102 include, for example, a laptop, a mobile phone, a tablet computer, a desktop computer, a server computer, a smart device, a router, an Internet-of-Things (IoT) device such as an MSP smart home appliance, a smart home security system, an autonomous vehicle, a smart health monitor, smart factory equipment, a wireless inventory tracker, a biometric scanner, or a combination thereof.

In some aspects, the CSP control infrastructure 108 may be owned and operated by a cyber security service provider for purposes of, for example, providing cyber security services to user devices. In some aspects, the CSP control infrastructure 108 may include a processing unit 110 and a security database 112 associated with providing the cyber security services, which may include configuring and providing the security application 104 to the user device 102. In an example, the CSP control infrastructure 108 may configure and provide the security application 104 to enable classification of data files associated with the user device 102.

The CSP control infrastructure 108 may include a combination of hardware and software components that enable provision of cyber security services to the user devices. The CSP control infrastructure 108 may interface with (the security application on) the user device via an application programming interface (API) (not shown), which may include one or more endpoints to a defined request-response message system. In an example, the API may be communicatively coupled with the processing unit 110 and/or the security database 112 to enable the CSP control infrastructure 108 to provide the cyber security services to the user devices. The processing unit 110 may be configured to configure and provide the security application 104 to the user device 102. In some aspects, the processing unit 110 may be a logical unit including a logical component configured to perform complex operations associated with computing, for example, numerical weights related to various factors associated with providing the cyber security services. The processing unit 110 may utilize the API to transmit information associated with the cyber security services to the user devices 102.

In some aspects, the network 114 may include any digital network that permits several nodes to share and access resources. In some aspects, the network 114 may include one or more of, for example, a local-area network (LAN), a wide-area network (WAN), a campus-area network (CAN), a metropolitan-area network (MAN), a home-area network (HAN), Internet, Intranet, Extranet, and Internetwork.

One or more components (e.g., processing unit 110, security database 112, security application 104, processing unit 106) included in the CSP control infrastructure 108 and/or included in the user devices 102, as shown in FIG. 1, may further be associated with a controller/processor, a memory, a communication interface, or a combination thereof (e.g., FIG. 5). For instance, the one or more components may include or may be included in a controller/processor, a memory, or a combination thereof. In some aspects, the one or more components included in the CSP control infrastructure 108 may be separate and distinct from each other. Alternatively, in some aspects, the one or more of the components included in the CSP control infrastructure 108 may be combined with one or more of the other components. In some aspects, the one or more of the components included in the CSP control infrastructure 108 and/or the user devices 102 may be local with respect to one or more of other components included in the CSP control infrastructure 108 and/or the user device 102. Alternatively, in some aspects, one or more of the components included in the CSP control infrastructure 108 and/or the user device 102 may be located remotely with respect to one or more of other components included in the CSP control infrastructure 108 and/or the user device 102. Additionally, or alternatively, one or more components of the components included in the CSP control infrastructure 108 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A user device may store data in an associated storage device. The data may be stored in various forms including in a form of a data file. For instance, the user device may utilize a data file as a resource for storing data in the storage device. Such data may include any type of data such as, for example, text data, document data, audio data, graphics data, image data, video data, or a combination thereof. Some examples of types of data files include system files, executable files, library files, database files, or the like.

To affect operation of the user device, a malicious party may gain unauthorized access to the user device by, for example, embedding malware in a data file downloaded and/or stored by the user device in the storage device. Malware may include any type of software designed to track communication associated with the user device and/or exploit or damage hardware and/or software associated with the user device. Some examples of malware may include viruses, Trojans, spyware, ransomware, adware, cookies, or a combination thereof. When the user device processes (e.g., opens the data file, executes the data file, etc.) the data file, the malware may activate and may enable the malicious party to gain unauthorized access to the user device.

Unauthorized access by the malicious party may cause several security issues. In an example, the malicious party may gain unauthorized access to private information and/or sensitive data associated with the user device. In another example, the malicious party may execute an unauthorized transmission of data stored in the storage device and/or may execute an unauthorized deletion of the data. In yet another example, the malicious party may utilize the malware to affect operation of the user device such that, for example, an operating system utilized by the user device may run slower and/or associated circuitry may emit excessive heat and/or noise, thereby causing damage to the user device. The user device may inefficiently expend various device resources (e.g., processing resources, memory resources, power consumption resources, battery life, or the like) in efforts to mitigate the security issues caused by the unauthorized access.

In such cases, it may be prudent to classify data files prior to the user device processing the files. As a result, the user device may avoid processing of a data file including malware, thereby mitigating instances in which the malicious party may gain unauthorized access to the user device. Typically, classification of data files involves feature extraction in which the user device is to extract and analyze relevant features from the metadata associated with the data file. As such, feature extraction requires the user device to develop and possess detailed knowledge regarding relevance of features. Further, feature extraction requires the user device to perform the onerous task of locating the relevant features within the metadata and extracting the located relevant features from the metadata. The user device may inefficiently expend various device resources (e.g., processing resources, memory resources, power consumption resources, battery life, or the like) in efforts to perform tasks associated with feature extraction.

Various aspects of systems and techniques discussed in the present disclosure enable classification of data files associated with a user device. Such classification may enable to identify whether a given data file includes malware so that the user device may avoid processing the given data file. Further, such classification may be performed without feature extraction. In some aspects, the user device may communicate with a CSP control infrastructure to receive cyber security services. In an example, the user device may receive and install a security application configured by the CSP control infrastructure to enable the user device to determine whether the given data file includes malware. For instance, the security application may calculate a compression function based at least in part on the content included in the given data file. In some aspects, the calculated compression function may indicate a difference metric to indicate a degree of difference between the content included in the given data file and content included in a known data file. When the difference metric indicates a low degree of difference between the content included in the given data file and content included in a clean data file, that is known to be free of malware, the user device may determine that the given data file is likely free of malware. Similarly, when the difference metric indicates a low degree of difference between the content included in the given data file and content included in a malicious data file, known to include malware, the user device may determine that the given data file likely includes malware. In some aspects, the calculated compression function may indicate a similarity metric to indicate a degree of similarity between the content included in the given data file and content included in a known data file. When the similarity metric indicates a high degree of similarity between the content included in the given data file and the content included in the clean data file, the user device may determine that the given file is likely free of malware. Similarly, when the similarity metric indicates a high degree of similarity between the content included in the given data file and the content included in the malicious data file, the user device may determine that the given data file likely includes malware. In some aspects, when a threshold amount of the given data files are to be classified, the user device and/or the security application may train and utilize a machine learning model to classify the given data files. In this way, based at least in part on utilizing compression functions that indicate a difference metric and/or a similarity metric, the security application and/or the user device may classify the given data file without using feature extraction. As a result, the security application and/or the user device may mitigate instances of a malicious party gaining unauthorized access to the user device, while enabling efficient utilization of various device resources (e.g., processing resources, memory resources, power consumption resources, battery life, or the like) for performing suitable tasks associated with, for example, classification of data files.

In some aspects, a processor (e.g., processor 106) associated with a user device executing a security application may determine a combined data set including query data files that are to be classified, clean data files that are known to be free of malware, and malicious data files that are known to include malware; calculate respective compression functions for each of the query data files, each of the clean data files, and each of the malicious data files; individually compare each respective compression function with each other respective compression function to determine degrees of similarity between contents included in the data files; determine a plurality of clusters based at least in part on the degrees of similarity between contents included in the data files, each cluster including any combination of the query data files, the clean data files, and the malicious data files; and classify each query data file as a file that is likely free of malware or as a file that likely includes malware based at least in part on analyzing the combination of the query data files, the clean data files, and the malicious data files in each cluster.

FIG. 2 is an illustration of an example flow 200 associated with classification of data files, according to various aspects of the present disclosure. The example flow 200 may include a user device 102 in communication with a CSP control infrastructure 108, owned and operated by a cyber security service provider. In some aspects, the user device 102 and the control infrastructure 108 may communicate with each other over a network (e.g., network 114). The control infrastructure 108 may configure and provide a security application 104 to enable classification of the data files. Although only one user device 102 is shown in FIG. 2, the present disclosure contemplates inclusion of any number of user devices that operate in a similar and/or analogous manner as discussed herein.

In some aspects, the security application 104 may enable the user device 102 to receive information to be processed by the security application and/or by the CSP control infrastructure 108. The security application 104 may include a graphical user interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the security application 104 may activate and/or enable, at an appropriate time, the graphical interface for receiving the information. For instance, the security application 104 may cause a screen (e.g., local screen) associated with the user device 102 to display, for example, a pop-up message to request entry of the information. Further, the security application 104 may enable transmission of at least a portion of the information to the CSP control infrastructure 108. In some aspects, the security application 104 may utilize a processing unit (e.g., processing unit 106, processor 520) associated with the user device 102 to perform processes/operations associated with classification of the data files.

As shown by reference numeral 210, the CSP control infrastructure 108 may make the security application 104 available to the user device 102. In some aspects, the CSP control infrastructure 108 may configure the security application 104 to enable the user device 102 to classify data files associated with the user device 102. The data files may be stored in an electronic memory (e.g., database) associated with the user device 102. Based at least in part on configuring the security application 104, the CSP control infrastructure 108 may transmit the security application 104 to the user device 102. In another example, based at least in part on configuring the security application 104, the CSP control infrastructure 108 may enable the user device 102 to download the security application 104 from a storage location (e.g., security database 112) associated with the CSP control of the structure 108. The security application 104 may be configured to enable the user device 102 to classify data files as data files that are likely to be free of malware or as data files that are likely to include malware.

As shown by reference numeral 220, the user device may determine a data set of data files including clean data files and malicious data files. Each clean data file may be known to be free of malware and each malicious data file may be known to include malware. In some aspects, the data set may be a balanced data set such that clean data files and malicious data files are represented in substantially similar amounts. In an example, the balanced data set may include substantially the same amount of clean data files as malicious data files.

Based at least in part on determining the balanced data set, as shown by reference numeral 230, the user device 102 may determine a compression function to be utilized for classifying data files. In some aspects, as discussed below in further detail, the compression function may be capable of indicating a similarity metric and/or a difference metric associated with content included in a given data file. In an example, the similarity metric may be capable of indicating a degree of similarity between the content included in the given data file and content included in another data file. Similarly, the difference metric may be capable of indicating a degree of difference between the content included in the given data file and content included in another file.

Based at least in part on determining the compression function, as shown by reference numeral 240, the user device 102 may determine a combined data set including query data files, that are to be classified, clean data files, and malicious data files. In some aspects, the user device 102 may determine the combined data set based at least in part on combining the query data files with the balanced data set including the clean data files and the malicious data files.

Based at least in part on determining the combined data set, as shown by reference numeral 250, the user device 102 may calculate compression functions for data files included in the combined data set (e.g., apply compression function for data) and compare results of calculating the compression functions. In some aspects, the user device 102 may calculate a respective compression function for each data file included in the combined data set. As a result, for a combined data set including, for example, 40 query data files, 30 clean data files, and 30 malicious data files, the user device 102 may calculate 40 respective compression functions for the 40 query data files, 30 respective compression functions for the 30 clean data files, and 30 respective compression functions for the 30 malicious data files. In other words, in this example, the user device 102 may calculate a hundred compression functions (e.g., apply compression function for data).

Further, for a given file included in the combined data set, the user device 102 may utilize the security application 104 to individually compare a given compression function calculated based at least in part on content included in the given file with each compression function calculated based at least in part on content included in each other file in the combined data set. For example, for a given query data file, the user device 102 may individually compare the given compression function calculated based at least in part on content included in the given query data file (i) with each compression functions calculated based on content included in each of the remaining 39 query data files, (ii) with each compression function calculated based on content included in each of the 30 clean data files, and (iii) with each compression function calculated based on content included in each of the 30 malicious data files. Individually comparing the compression functions may indicate a degree of similarity and/or degree of difference between the content included in the given query file and content included in each of the remaining 39 query data files, each of the 30 clean data files, and each of the 30 malicious data files. As a result, for the given query data file, the user device 102 may determine 99 degrees of similarity and/or 99 degrees of difference.

The user device may determine the degree of similarity and/or degree of difference, as discussed immediately above, for each file included in the combined data set. As a result, for each file included in the combined data set, the user device 102 may determine 99 degrees of similarity and/or 99 degrees of difference. In other words, the user device 102 may determine 99 degrees of similarity and/or 99 degrees of difference for each of the 40 query data files, 99 degrees of similarity and/or 99 degrees of difference each of the 30 clean data files, and 99 degrees of similarity and/or 99 degrees of difference each of the 30 malicious data files.

As shown by reference numeral 260, the user device 102 may determine a plurality of clusters of data files. The plurality of clusters may be determined in different ways. In one example, a first cluster may be determined based at least in part on the user device 102 randomly selecting, at a given time, a data file (query, clean, or malicious) from among the 100 data files included in the combined data set as a center file. In some aspects, the center file may represent content included in all data files included in the cluster. Further, the user device 102 may assign a threshold high degree of similarity and/or a threshold low degree of difference for determining other data files to be included in the first cluster. For instance, the user device 102 may include in the first cluster each data file that satisfies the threshold high degree of similarity and/or the threshold low degree of difference. As a result, the first cluster may include each data file that includes content similar to the content included in the center file within the threshold high degree of similarity and/or the threshold low degree of difference. In some aspects, the user device 102 may continue to select a file as the center file until each file from among the hundred data files has been selected as the center file at least once. In this case, the user device 102 may determine a hundred clusters. In some aspects, each cluster from among the plurality of clusters may include any combination of query data files, clean data files, and malicious data files.

In another example, the user device 102 may determine a random amount of clusters, with each cluster including a random amount of data files within assigned threshold low or high degrees of similarity and/or assigned threshold low or high degrees of difference. In some aspects, the user device 102 may vary a level of the threshold high degree of similarity, the threshold low degree of difference, the threshold low degree of similarity, and/or the threshold high degree of difference to determine the random amount of clusters. In some aspects, the user device 102 may continue to determine clusters until each file in the combined data set is included in at least one cluster. In some aspects, each cluster from among the plurality of clusters may include any combination of query data files, clean data files, and malicious data files.

In yet another example, the user device 102 may analyze the 99 degrees of similarity and/or the 99 degrees of difference associated with each data file. Based at least in part on the analysis, the user device 102 may group in the same cluster data files having a threshold high degree of similarity and/or a threshold low degree of difference (e.g., having similar content). Further, based at least in part on the analysis, the user device 102 may separate data files having a threshold low degree of similarity and/or a threshold high degree of difference (e.g., having dissimilar content) to place such data files in different clusters. In other words, the user device 102 may group together data files with a threshold amount of similarities (e.g., a threshold amount of similarity in included content) and may separate data files with a threshold amount of dissimilarities (e.g., a threshold amount of difference in included content). In some aspects, the user device 102 may vary a level of the threshold high degree of similarity, the threshold low degree of difference, the threshold low degree of similarity, and/or the threshold high degree of difference to determine the plurality of clusters. In some aspects, each cluster from among the plurality of clusters may include any combination of query data files, clean data files, and malicious data files.

As shown by reference numeral 270, the user device 102 may classify the query data files based at least in part on analyzing the determined plurality of clusters. In some aspects, the user device 102 may classify the query data files based at least in part on a number of query data files, a number of clean data files, and a number of malicious data files included in each cluster. In an example, when a given cluster includes only query data files and malicious data files, the user device 102 may classify the included query data files as files that likely include malware. Similarly, when a given cluster includes only query data files and clean data files, the user device 102 may classify the included query data files as files that are likely free of malware. In another example, when a given cluster includes a threshold amount (e.g., 85%, 95%, 95%) of malicious data files, the user device 102 may classify the included query data files as files that likely include malware. Similarly, when a given cluster includes a threshold amount (e.g., 85%, 95%, 95%) of clean data files, the user device may classify the included query data files as files that are likely free of malware.

In some aspects, in addition to classifying the query data files, the user device 102 may assign a confidence level to a classification of a query data file. The confidence level may include a low level (e.g., expressed as a "0"), a medium level (e.g., expressed as a numerical value between "0" and "1"), or a high level (e.g., expressed as a "1"), and may be based at least in part on a composition of the files within the cluster that includes the query data file. Further, the confidence level may be based at least in part on the degree of difference and/or the degree of similarity among the files included in the cluster.

In an example, when a cluster includes the query data file and a plurality of clean files, the user device 102 may classify the query data file as a file that is likely free of malware with high confidence. However, when the degree of similarity between the query data file and the plurality of clean files as low (e.g., the content included in the query data file and the plurality of clean data files is not very similar), the user device 102 may classify the query the data file as a file that is likely free of malware with, for example, medium confidence or low confidence. Similarly, when the cluster includes a plurality of query data files and a nominal amount of malicious data files, the user device 102 may classify the plurality of query data files as files that likely include malware with low confidence. However, when the degree of similarity among the plurality of query data files and the nominal amount of malicious data files is high (e.g., the content included in the plurality of query data files and the malicious data files is very similar), the user device 102 may classify the plurality of query data files a files that likely include malware with, for example, medium confidence or high confidence. Further, when the cluster includes a plurality of query data files and a substantially similar amount of clean data files, the user device 102 may classify the plurality of query data files as files that are likely free of malware with medium confidence.

In this way, based at least in part on utilizing compression functions that indicate a difference metric and/or a similarity metric, the security application and/or the user device may classify a query data file without using feature extraction and prior to processing the query data file. As a result, the security application and/or the user device may mitigate instances of a malicious party gaining unauthorized access to the user device, while enabling efficient utilization of various device resources (e.g., processing resources, memory resources, power consumption resources, battery life, or the like) for performing suitable tasks associated with, for example, classification of data files.

As indicated above, FIG. 2 is provided as an example. Other examples may differ from what is described with regard to FIG. 2.

FIG. 3 is an illustration of an example 300 associated with classification of data files, according to various aspects of the present disclosure. As shown in FIG. 3, the user device 102 may include the processing unit 106, which may include and/or utilize a self-learning machine learning model (ML model) 310 in connection with classification of data files. In some aspects, the ML model 310 may include a supervised learning model. In some aspects, the ML model 310 may include an unsupervised learning model. The processing unit 106 may utilize the ML model 310 to determine a need to perform an action related to classification of data files.

As shown by reference numeral 320, the ML model 310 may obtain training data including metadata and/or previous metadata associated with information received during at least one previous instance of classification of data files and/or update data associated with an output provided by the ML model 310 during at least one previous instance of classification of data files. In some aspects, the training data may include data associated with the ML model 310 calculating similarity metrics and/or difference metrics, determining clusters based at least in part on calculating the similarity metrics and/or the difference metrics, and/or classifying query data files based at least in part on determining the clusters, as discussed elsewhere herein. In some aspects, the processing unit 106 may store the above training data in, and the ML model 310 may obtain the above training data from, for example, one or more memories (e.g., memory 530) associated with the user device 102. In some aspects, the previous metadata may include historical metadata associated with the at least one previous instance of classification of data files. In some aspects, the update data may include historical output data associated with at least one previous instance of classification of data files. In some aspects, the ML model 310 may obtain input training data that is input via an interface associated with the control infrastructure 108.

As shown by reference number 330, the ML model 310 may process the training data using a machine learning algorithm (ML algorithm). In some aspects, the ML model 310 may utilize the ML algorithm to evaluate the training data to learn trends and patterns associated with classification of data files. In some aspects, the ML algorithm may evaluate and take into account feedback information (e.g., success rate) associated with previously classified data files. The ML algorithm may provide output data to the processing unit 106 based at least in part on the evaluated training data and the learned trends and patterns. In some aspects, the output data may indicate a value associated with the likelihood that the data files were successfully classified, thereby assisting the processing unit 106 in more accurately classifying data files in the future.

As shown by reference number 340, at an end of an instance of classification of data files, the ML model 310 may receive update data including at least the training data and/or the output data. In some aspects, the update data may be included in the previous metadata stored in the one or more memories (e.g., memory 530) to be used as training data for future iterations of classification of data files. In some aspects, the ML model 310 may evaluate the update data to learn various aspects such as accuracy, consistency, reliability, efficiency, and/or the like of the output data to enable the processing unit 106 to more accurately classify the data files. In this way, the processing unit 106 may utilize the ML model 310 to apply a rigorous and automated process to pacify the data files. In some aspects, the processing unit 106 may more accurately calculate similarity metrics and/or difference metrics, determine clusters based at least in part on calculating the similarity metrics and/or the difference metrics, and/or classify query data files based at least in part on determining the clusters.

As indicated above, FIG. 3 is provided as an example. Other examples may differ from what is described in connection with FIG. 3.

FIG. 4 is an illustration of an example process 400 associated with classification of data files, according to various aspects of the present disclosure. In some aspects, the process 400 may be performed by a memory and/or a processor/controller (e.g., processing unit 106, processor 520) associated with a user device (e.g., user device 102). As shown by reference numeral 410, process 400 may include determining, by a user device, a combined data set including query data files that are to be classified, clean data files that are known to be free of malware, and malicious data files that are known to include malware. For instance, the user device may utilize the associated memory and/or processor to determine a combined data set including query data files that are to be classified, clean data files that are known to be free of malware, and malicious data files that are known to include malware, as discussed elsewhere herein.

As shown by reference numeral 420, process 400 may include calculating, by the user device, respective compression functions for each of the query data files, each of the clean data files, and each of the malicious data files. For instance, the infrastructure device may utilize the associated memory and/or processor to calculate respective compression functions for each of the query data files, each of the clean data files, and each of the malicious data files, as discussed elsewhere herein.

As shown by reference numeral 430, process 400 may include individually comparing, by the user device, each respective compression function with each other respective compression function to determine degrees of similarity between contents included in the data files. For instance, the user device may utilize the associated memory and/or processor to individually compare each respective compression function with each other respective compression function to determine degrees of similarity between contents included in the data files, as discussed elsewhere herein.

As shown by reference numeral 440, process 400 may include determining, by the user device, a plurality of clusters based at least in part on the degrees of similarity between contents included in the data files, each cluster including any combination of the query data files, the clean data files, and the malicious data files. For instance, the user device may utilize the associated memory and/or processor to individually compare each respective compression function with each other respective compression function to determine degrees of similarity between contents included in the data files, as discussed elsewhere herein.

As shown by reference numeral 450, process 400 may include classifying, by the user device, each query data file as a file that is likely free of malware or as a file that likely includes malware based at least in part on analyzing the combination of the query data files, the clean data files, and the malicious data files in each cluster. For instance, the infrastructure device may utilize the associated memory and/or processor to classify each query data file as a file that is likely free of malware or as a file that likely includes malware based at least in part on analyzing the combination of the query data files, the clean data files, and the malicious data files in each cluster, as discussed elsewhere herein.

Process 400 may include additional aspects, such as any single aspect or any combination of aspects described below and/or in connection with one or more other processes described elsewhere herein.

In a first aspect, in process 400, determining the plurality of clusters includes determining a cluster based at least in part on selecting a data file, from among the query data files, the clean data files, and the malicious data files, as a center file, content in the center file being representative of content included in data files included in the cluster.

In a second aspect, alone or in combination with the first aspect, in process 400, determining the plurality of clusters includes determining a cluster by selecting each data file, from among the query data files, the clean data files, and the malicious data files, as a center file that represents content included in data files included in the cluster.

In a third aspect, alone or in combination with the first through second aspects, in process 400, determining the plurality of clusters includes assigning a threshold degree of similarity to a cluster, the threshold degree of similarity indicating the data files that are to be included in the cluster.

In a fourth aspect, alone or in combination with the first through third aspects, in process 400, determining the plurality of clusters includes assigning a first threshold degree of similarity to a first cluster to determine data files that are to be included in the first cluster, and assigning a second threshold degree of similarity to a second cluster to determine data files that are to be included in the second cluster, the first threshold degree of similarity being different from the second threshold degree of similarity.

In a fifth aspect, alone or in combination with the first through fourth aspects, in process 400, determining the plurality of clusters includes determining the plurality of clusters until each data file, from among the query data files, the clean data files, and the malicious data files, is included in a cluster.

In a sixth aspect, alone or in combination with the first through fifth aspects, in process 400, determining the plurality of clusters includes including data files having similar content in a given cluster and including data files having dissimilar content in separate clusters.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of example devices 500 associated with classification of data files, according to various aspects of the present disclosure. In some aspects, the example devices 500 may form part of or implement the systems, servers, environments, infrastructures, components, devices, or the like described elsewhere herein (e.g., control infrastructure, VPN server, etc.) and may be used to perform example processes described elsewhere herein. The example devices 500 may include a universal bus 510 communicatively coupling a processor 520, a memory 530, a storage component 540, an input component 550, an output component 560, and a communication interface 570.

Bus 510 may include a component that permits communication among multiple components of a device 500. Processor 520 may be implemented in hardware, firmware, and/or a combination of hardware and software. Processor 520 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 520 may include one or more processors capable of being programmed to perform a function. Memory 530 may include a random access memory (RAM), a read only memory (ROM), and/or another type of dynamic or static storage device (e.g., a flash memory, a magnetic memory, and/or an optical memory) that stores information and/or instructions for use by processor 520.

Storage component 540 may store information and/or software related to the operation and use of a device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 may include a component that permits a device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 may include a component that provides output information from device 500 (via, for example, a display, a speaker, a haptic feedback component, an audio or visual indicator, and/or the like).

Communication interface 570 may include a transceiver-like component (e.g., a transceiver, a separate receiver, a separate transmitter, and/or the like) that enables a device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

A device 500 may perform one or more processes described elsewhere herein. A device 500 may perform these processes based on processor 520 executing software instructions stored by a non-transitory computer-readable medium, such as memory 530 and/or storage component 540. As used herein, the term "computer-readable medium" may refer to a non-transitory memory device. A memory device may include memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 5 are provided as an example. In practice, a device 500 may include additional components, fewer components, different components, or differently arranged components than those shown in FIG. 5. Additionally, or alternatively, a set of components (e.g., one or more components) of a device 500 may perform one or more functions described as being performed by another set of components of a device 500.

As indicated above, FIG. 5 is provided as an example. Other examples may differ from what is described with regard to FIG. 5.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of ").

What is claimed is:

1. A method for classification of data files, the method comprising:

determining, by a user device, a combined data set of data files including query data files that are to be classified, clean data files that are known to be free of malware, and malicious data files that are known to include malware;

calculating, by the user device, respective compression functions for each of the query data files, each of the clean data files, and each of the malicious data files, the respective compression functions indicating respective similarity metrics;

individually comparing, by the user device, each respective compression function from among the respective compression functions with each other respective compression function from among the respective compression functions to determine degrees of similarity between contents included in the data files based at least in part on the respective similarity metrics;

determining, by the user device, a plurality of clusters based at least in part on the degrees of similarity between contents included in the data files, each cluster from among the plurality of clusters including any combination of the query data files, the clean data files, and the malicious data files; and classifying, by the user device, each of the query data files as a file that is likely free of malware or as a file that likely includes malware based at least in part on analyzing the combination of the query data files, the clean data files, and the malicious data files in each cluster from among the plurality of clusters.

2. The method of claim 1, wherein determining the plurality of clusters includes determining a cluster based at least in part on selecting a data file, from among the query data files, the clean data files, and the malicious data files, as a center file, content in the center file being representative of content included in data files included in the cluster.

3. The method of claim 1, wherein determining the plurality of clusters includes determining a cluster by selecting each data file, from among the query data files, the clean data files, and the malicious data files, as a center file that represents content included in data files included in the cluster.

4. The method of claim 1, wherein determining the plurality of clusters includes assigning a threshold degree of similarity to a cluster, the threshold degree of similarity indicating the data files that are to be included in the cluster.

5. The method of claim 1, wherein determining the plurality of clusters includes assigning a first threshold degree of similarity to a first cluster to determine data files that are to be included in the first cluster, and assigning a second threshold degree of similarity to a second cluster to determine data files that are to be included in the second cluster, the first threshold degree of similarity being different from the second threshold degree of similarity.

6. The method of claim 1, wherein determining the plurality of clusters includes determining the plurality of clusters until each data file, from among the query data files, the clean data files, and the malicious data files, is included in a cluster.

7. The method of claim 1, wherein determining the plurality of clusters includes including data files having similar content in a given cluster and including data files having dissimilar content in separate clusters.

8. A user device for classification of data files, the user device comprising:
a memory; and
a processor communicatively coupled to the memory, the memory and the processor being configured to:
determine a combined data set of data files including query data files that are to be classified, clean data files that are known to be free of malware, and malicious data files that are known to include malware;
calculate respective compression functions for each of the query data files, each of the clean data files, and each of the malicious data files, the respective compression functions indicating respective similarity metrics;
individually compare each respective compression function from among the respective compression functions with each other respective compression function from among the respective compression functions to determine degrees of similarity between contents included in the data files based at least in part on the respective similarity metrics;
determine a plurality of clusters based at least in part on the degrees of similarity between contents included in the data files, each cluster from among the plurality of clusters including any combination of the query data files, the clean data files, and the malicious data files; and
classify each of the query data files file-as a file that is likely free of malware or as a file that likely includes malware based at least in part on analyzing the combination of the query data files, the clean data files, and the malicious data files in each cluster from among the plurality of clusters.

9. The user device of claim 8, wherein, to determine the plurality of clusters, the memory and the processor are configured to determine a cluster based at least in part on selecting a data file, from among the query data files, the clean data files, and the malicious data files, as a center file, content in the center file being representative of content included in data files included in the cluster.

10. The user device of claim 8, wherein, to determine the plurality of clusters, the memory and the processor are configured to determine a cluster by selecting each data file, from among the query data files, the clean data files, and the malicious data files, as a center file that represents content included in data files included in the cluster.

11. The user device of claim 8, wherein, to determine the plurality of clusters, the memory and the processor are configured to assign a threshold degree of similarity to a cluster, the threshold degree of similarity indicating the data files that are to be included in the cluster.

12. The user device of claim 8, wherein, to determine the plurality of clusters, the memory and the processor are configured to assign a first threshold degree of similarity to a first cluster to determine data files that are to be included in the first cluster, and to assign a second threshold degree of similarity to a second cluster to determine data files that are to be included in the second cluster, the first threshold degree of similarity being different from the second threshold degree of similarity.

13. The user device of claim 8, wherein, to determine the plurality of clusters, the memory and the processor are configured to determine the plurality of clusters until each data file, from among the query data files, the clean data files, and the malicious data files, is included in a cluster.

14. The user device of claim 8, wherein, to determine the plurality of clusters, the memory and the processor are configured to include data files having similar content in a given cluster, and to include data files having dissimilar content in separate clusters.

15. A non-transitory computer-readable medium configured to store instructions for classification of data files, which when executed by a processor associated with an infrastructure device, configure the processor to:
determine a combined data set of data files including query data files that are to be classified, clean data files that are known to be free of malware, and malicious data files that are known to include malware;
calculate respective compression functions for each of the query data files, each of the clean data files, and each of the malicious data files, the respective compression functions indicating respective similarity metrics;
individually compare each respective compression function from among the respective compression functions with each other respective compression function from among the respective compression functions to determine degrees of similarity between contents included in the data files based at least in part on the respective similarity metrics;
determine a plurality of clusters based at least in part on the degrees of similarity between contents included in the data files, each cluster from among the plurality of clusters including any combination of the query data files, the clean data files, and the malicious data files; and classify each of the query data files as a file that is likely free of malware or as a file that likely includes malware based at least in part on analyzing the combination of the query data files, the clean data files, and the malicious data files in each cluster from among the plurality of clusters.

16. The non-transitory computer-readable medium of claim 15, wherein, to determine the plurality of clusters, the processor is configured to determine a cluster based at least in part on selecting a data file, from among the query data files, the clean data files, and the malicious data files, as a center file, content in the center file being representative of content included in data files included in the cluster.

17. The non-transitory computer-readable medium of claim 15, wherein, to determine the plurality of clusters, the processor is configured to determine a cluster by selecting each data file, from among the query data files, the clean data files, and the malicious data files, as a center file that represents content included in data files included in the cluster.

18. The non-transitory computer-readable medium of claim 15, wherein, to determine the plurality of clusters, the processor is configured to assign a threshold degree of similarity to a cluster, the threshold degree of similarity indicating the data files that are to be included in the cluster.

19. The non-transitory computer-readable medium of claim 15, wherein, to determine the plurality of clusters, the processor is configured to assign a first threshold degree of similarity to a first cluster to determine data files that are to be included in the first cluster, and to assign a second threshold degree of similarity to a second cluster to determine data files that are to be included in the second cluster, the first threshold degree of similarity being different from the second threshold degree of similarity.

20. The non-transitory computer-readable medium of claim 15, wherein, to determine the plurality of clusters, the processor is configured to determine the plurality of clusters until each data file, from among the query data files, the clean data files, and the malicious data files, is included in a cluster.

* * * * *